United States Patent
Kruse et al.

(10) Patent No.: US 8,684,639 B2
(45) Date of Patent: Apr. 1, 2014

(54) DEVICE FOR LIMITING THE ADVANCE DURING A DRILLING OPERATION

(75) Inventors: Mathias Kruse, Lasbek (DE); Rolf Clausen, Norderstedt (DE); Thomas Goohsen, Fredenbeck (DE); Wolfgang Hintze, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 1105 days.

(21) Appl. No.: 12/085,610

(22) PCT Filed: Dec. 21, 2006

(86) PCT No.: PCT/EP2006/070070
§ 371 (c)(1),
(2), (4) Date: Jul. 9, 2009

(87) PCT Pub. No.: WO2007/071757
PCT Pub. Date: Jun. 28, 2007

(65) Prior Publication Data
US 2009/0304467 A1   Dec. 10, 2009

(30) Foreign Application Priority Data
Dec. 21, 2005   (DE) .......................... 10 2005 061 190

(51) Int. Cl.
*B23B 47/34*   (2006.01)
(52) U.S. Cl.
USPC .............................. 408/67; 408/112; 408/202
(58) Field of Classification Search
USPC .......... 408/67, 84, 95, 97, 110–112, 113, 202
IPC ............. B23B 47/34; B23Q 11/02,11/00, 11/08
See application file for complete search history.

(56) References Cited

U.S. PATENT DOCUMENTS 2,301,151 A * 11/1942 Spievak .................. 408/112
2,409,377 A * 10/1946 Miller ..................... 408/112
(Continued)

FOREIGN PATENT DOCUMENTS

FR   DE68902953 T2   3/1993
JP   61-172718        8/1986
(Continued)

OTHER PUBLICATIONS

Japanese Notice of Allowance for Japanese Application No. 2008-546465 dated Mar. 13, 2012, Not in English.

(Continued)

*Primary Examiner* — Daniel Howell
(74) *Attorney, Agent, or Firm* — Jenkins, Wilson, Taylor & Hunt. P.A.

(57) ABSTRACT

In a device for limiting the advance during a drilling operation, which can be used in conjunction with a hand drill or with an automatic manufacturing machine, the device comprising a housing with a stop cage and a spindle mounted rotatably and axially displaceably in the housing, and a stop which is adjustable in the axial direction being arranged for limiting the advance, the invention consists in that the stop cage (2a) comprises a pin fixed to the housing for breaking the chips, with a housing-side end and a free end, in such a way that it extends approximately parallel and directly adjacent to the workpiece surface and approximately radially from the outside towards the drilling tool in such a way that its free end almost touches the countersink. Damage to the surface of workpieces is prevented by the invention, so that corresponding refinishing is avoided. Moreover, the removal of the coiled chips from the drilling tool previously necessary after each drilling cycle is dispensed with.

3 Claims, 2 Drawing Sheets

(56) References Cited

U.S. PATENT DOCUMENTS

| | | | | |
|---|---|---|---|---|
| 2,608,114 | A | * | 8/1952 | Martin et al. ............... 408/112 |
| 2,794,353 | A | | 6/1957 | Bashlow et al. |
| 2,968,975 | A | * | 1/1961 | Niemeyer ..................... 408/22 |
| 3,060,772 | A | | 10/1962 | Crump |
| 3,301,101 | A | * | 1/1967 | McEwen ........................ 408/67 |
| 4,115,017 | A | * | 9/1978 | Wilhelmsson ................ 408/14 |
| 4,514,120 | A | * | 4/1985 | Hougen ........................ 409/137 |
| 4,743,148 | A | * | 5/1988 | Wahlbeck ..................... 409/137 |
| 4,824,299 | A | * | 4/1989 | Shoji et al. ................... 409/137 |
| 5,080,535 | A | * | 1/1992 | Hirano .......................... 408/67 |
| 5,421,680 | A | * | 6/1995 | Wu .............................. 408/1 R |
| 5,630,683 | A | * | 5/1997 | Smith ........................... 408/67 |

FOREIGN PATENT DOCUMENTS

| | | | |
|---|---|---|---|
| JP | 63-010012 | | 1/1988 |
| JP | 02-003313 | | 1/1990 |
| JP | 03-212161 | | 9/1991 |
| JP | 04294960 A | * | 10/1992 |
| JP | 08025118 A | * | 1/1996 |
| JP | 08174321 A | * | 7/1996 |
| JP | 10006172 A | * | 1/1998 |
| JP | 10337605 | | 12/1998 |
| JP | 2001079705 | | 3/2001 |
| JP | 2002 126921 | | 5/2002 |
| JP | 2006305704 A | * | 11/2006 |
| JP | 2008188744 A | * | 8/2008 |
| JP | 2010105132 A | * | 5/2010 |
| SU | 946811 B | * | 8/1982 |
| SU | 1237382 A | * | 6/1986 |
| SU | 1252073 | | 8/1986 |

OTHER PUBLICATIONS

Database WPI XP-002424555, "Axial Cutting Tool Swarf Cleaner", Derwent Publications Ltd., Mar. 25, 1981.
German Office Action dated Dec. 7, 2006, Not in English.
International Search Report and Written Opinion dated Mar. 23, 2007.

* cited by examiner

DEVICE FOR LIMITING THE ADVANCE DURING A DRILLING OPERATION

FIELD OF THE INVENTION

The invention relates to a device for limiting the advance during a drilling operation, the device being operable both in conjunction with a hand drill and with a numerically controlled automatic manufacturing machine.

BACKGROUND OF THE INVENTION

A device for limiting the advance during a drilling operation includes, for example, a cylindrical housing with a rotatably mounted spindle arranged coaxially therein with a drive-side end and a tool-side end, which has limited displaceability in the axial direction. The drive-side end of the spindle is designed in such a way that it can be clamped into a drill chuck of a hand drill or into a corresponding receiver of an automatic manufacturing machine. The tool-side end of the spindle is provided with an internal thread, into which an appropriate drilling tool can be screwed. What are known as stepped drill bits, which combine a drill bit and a countersink, are used as the drilling tool in conjunction with devices of the said kind. The drilling tool is surrounded by a stop cage, fixed to the housing, with lateral openings, which is brought to bear against a workpiece at the beginning of the drilling operation. Chips produced during drilling are intended to leave the stop cage through the lateral openings. To limit the drill advance in the direction towards the workpiece, an adjustable stop is provided inside the housing. Such devices are used in order to ensure reproducible countersinking depths in the production of bores with a countersunk recess. In this connection, on the one hand, too deep a countersunk recess may lead to rejects and, on the other hand, a countersunk recess with too small a depth makes complicated refinishing necessary.

It is a disadvantage of devices of the abovementioned kind that the chips produced lead to undesirable secondary effects depending on the material to be machined if the workpieces concerned have a sensitive surface. This undesirable effect consists in that, in particular during drilling of the countersunk recess, flowing chips are produced, which wind themselves around the tool and in this way give rise to coiled chips or chip coils. In this connection, the chip coils are whirled around the drilling tool, so that the rotating flowing chip wound around the drilling tool carries out uncontrolled movements and in doing so damages the surface of the workpiece to a greater or lesser extent by scratching. Removal of the scratches produced in this way requires a considerable degree of extra work. In addition, the operating sequence is disrupted by virtue of the chip coils having to be removed by hand after each drilling cycle.

SUMMARY OF THE INVENTION

It is one of the objects of the present invention to provide a device of the abovementioned kind in such a way that damage to workpiece surfaces by chip coils are reliably prevented.

This object may be achieved by a device for limiting the advance during a drilling operation that comprises a housing with a stop cage and a spindle mounted rotatably and axially displaceably in the housing, and a stop which is adjustable in the axial direction being arranged for limiting the advance, wherein the stop cage comprises a chip breaker for breaking the chips, with a housing-side end and a free end, in such a way that it extends approximately parallel and directly adjacent to the workpiece surface and approximately radially from the outside towards the drilling tool (stepped drill bit) in such a way that its free end almost touches the countersink.

Due to the fact that the stop cage comprises a pin fixed to the housing for breaking the chips, with a housing-side end and a free end, in such a way that it extends approximately parallel and directly adjacent to the workpiece surface and approximately radially from the outside towards the drilling tool (stepped drill bit) in such a way that its free end almost touches the countersink.

Damage to the surface of workpieces is prevented by at least one aspect of the invention, so that corresponding refinishing is avoided. Moreover, the removal of the coiled chips from the drilling tool previously necessary after each drilling cycle is dispensed with.

BRIEF DESCRIPTION OF THE DRAWINGS

The invention is explained in greater detail in the description and illustrated in the drawing, in which.

DETAILED DESCRIPTION OF THE INVENTION

Figure 1:
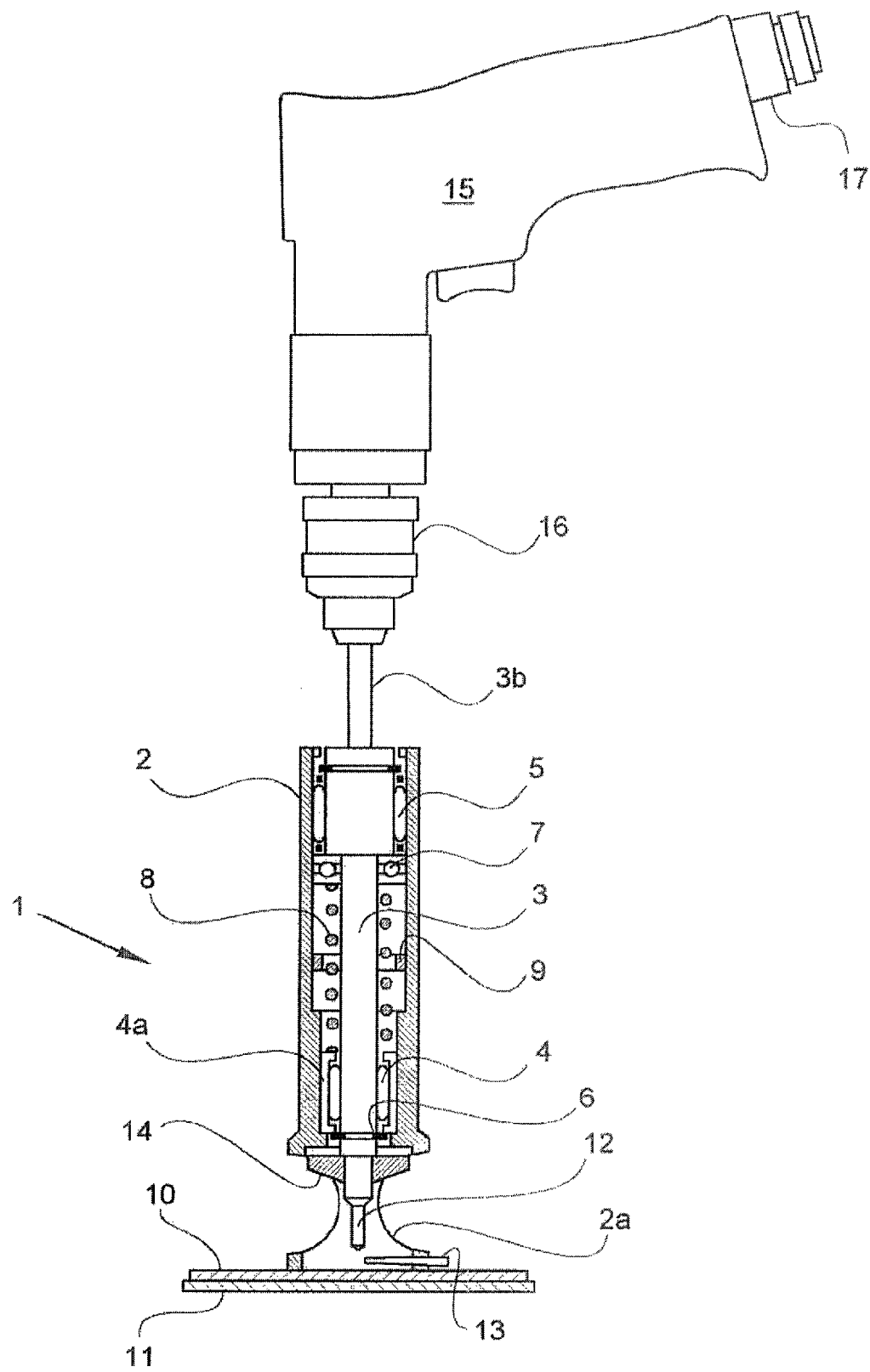
FIG. 1 shows a sectional illustration of a device for limiting the advance with a hand drill.

FIG. 1 shows a device 1 of a known kind for limiting the advance by way of example in conjunction with a hand drill, the device 1 comprising a housing 2 and, mounted rotatably therein, a spindle 3 with a widened part 3a and a shank part 3b. A lower needle bearing 4 and an upper needle bearing 5 serve for mounting the spindle 3. The spindle 3 is illustrated in its upper position. In this position, an axial retaining ring 6 arranged on the spindle 3 bears against that part 4a of the needle bearing 4 fixed to the housing. The lower end of the widened part 3a forms a shoulder against which a thrust ball bearing 7 bears. A compression spring 8, which is for its part supported with its lower end against the part 4a of the needle bearing 4 fixed to the housing, acts on this thrust ball bearing 7 from below in the diagram. A stop 9 which is adjustable in the axial direction is arranged inside the housing 2. The compression spring 8 is dimensioned in such a way that the spindle 3 is held securely in the position shown as a result of prestress. The lower part of the housing 2 is formed by a stop cage 2a. This stop cage 2a is placed onto a workpiece 10, which is to be drilled through simultaneously with another workpiece 11. A stepped drill bit 12, which is screwed into the lower end of the spindle 3, serves as the drilling tool. A pin 13 fixed to the housing with a housing-side end and a free end is arranged in the stop cage 2a in such a way that it extends approximately parallel and directly adjacent to the surface of the workpiece 10 and approximately radially from the outside towards the drilling tool.

A cone 14 is pushed and fixed onto the stepped drill bit 12. A hand drill 15 with a drill chuck 16 and a compressed-air connection 17 serves for driving the device 1. If a bore is then to be provided in the workpieces 10 and 11, the spindle 3 is, with the stepped drill bit 12 rotating, advanced towards the workpiece 10 counter to the force of the compression spring 8 by means of the handle of the hand drill 15. In this connection, the needle bearing 5 and the thrust ball bearing 7 follow the advance movement of the spindle 3. When the thrust ball bearing 7 touches the stop 9, the end position of the advance set using the stop 9 is reached.

Figure 2:
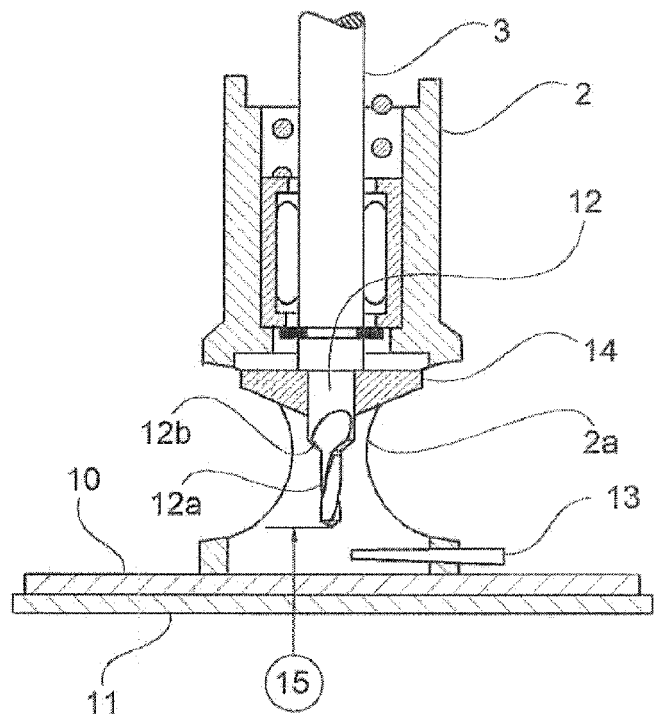
FIG. 2 shows a partial section of the device according to FIG. 1 at the beginning of the drilling operation.

FIG. 2 shows the lower part in the diagram of the device 1 according to FIG. 1 in a partial view with the housing 2, the stop cage 2a, the spindle 3, the workpieces 10 and 11, the drilling tool 12, the cone 14 and the pin 13. The stepped drill bit 12 serves simultaneously for drilling and for countersinking and accordingly comprises a twist drill 12a and a countersink 12b. In order during production of countersunk bores in the workpieces 10 and 11 to avoid damage caused by chips produced, the device 1 is according to the invention provided with the pin 13 and the cone 14. In this connection, the pin 13 takes on the function of a chip breaker. In the embodiment of the invention shown, the pin 13 is made from a suitable plastic, for example from polyamide, and is arranged in such a way that it extends approximately parallel and directly adjacent to the workpiece surface and approximately radially from the outside towards the drilling tool 12. Owing to the arrangement of this pin 13, flowing chips produced during drilling and countersinking are repeatedly broken off, so that their fragments can leave the stop cage 2a to the outside and the generation of chip coils is avoided. The pin 13 has a conical shape and is pressed into a corresponding conically shaped receiving bore in the stop cage and held here securely by self-locking. The cone 14 prevents the fragments of the chips passing into the upper part of the stop cage 2a. The position 15 shown of the twist drill 12a indicates its starting position.

Figure 3:
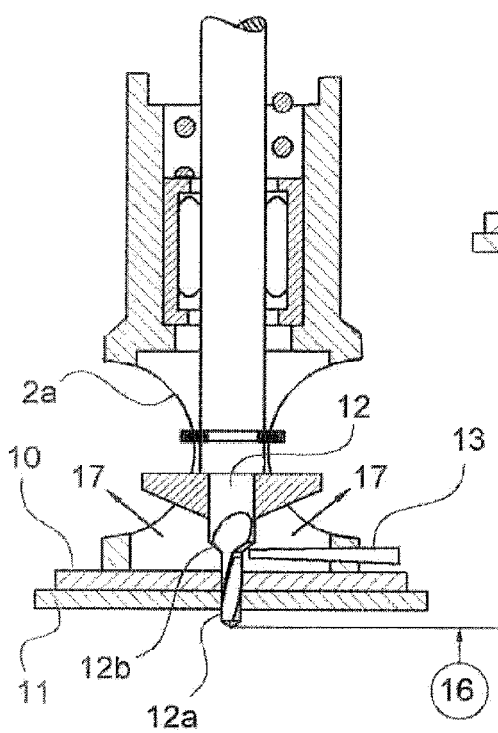
FIG. 3 shows the device according to FIG. 2 during the drilling operation.

FIG. 3 shows the device according to FIG. 2, the stepped drill bit 12 already being so far advanced that the twist drill 12a has drilled through the workpieces 10 and 11. In the process, the pin 13 has already acted as a chip breaker, so that the flowing chips produced have been divided into small fragments. The route by which the fragments leave the stop cage 2a is indicated by the arrows 17. To prepare the device 1 for drilling a series of particular countersunk bores, the appropriate stepped drill bit 12 is inserted. In this connection, the pin 13 is also replaced in each case. In the position 16 shown of the stepped drill bit 12, the stepped drill bit 12 is just touching the newly inserted pin 13 with the countersink 12b.

Figure 4:
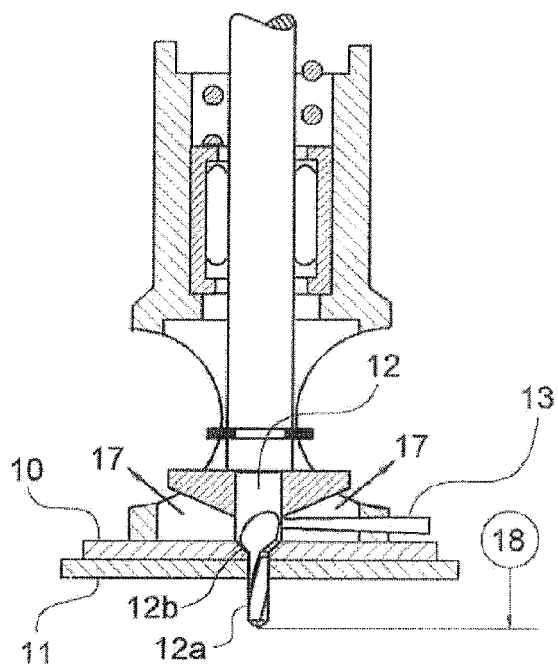
FIG. 4 shows the device according to FIG. 3 at the end of the drilling operation.

FIG. 4 shows the device according to FIG. 3, the stepped drill bit 12 with the twist drill 12a and the countersink 12b having reached the end position of the advance. In this position 18, a bore with a countersunk recess in the workpiece 10 is just finished. In this connection, the countersinking depth corresponds exactly to the value which is set by means of the stop 9 according to FIG. 1. On passing from the position 16 according to FIG. 3 to the position 18 according to FIG. 4, the end of the pin 13 is separated. The newly produced shape of the pin 13, which barely touches the countersink 12b, is kept for all further bores until the stepped drill bit 12 is exchanged. Only then is a new pin 13 inserted again. By virtue of this, special preparation of the pin for the particular case concerned is dispensed with; rather, the requisite shape of the pin 13 is produced automatically during use of the device 1.

Figure 5:
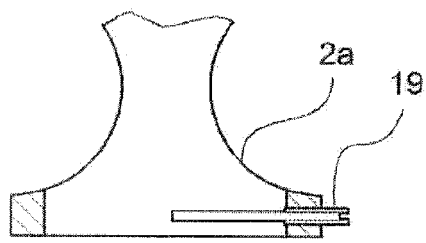

FIG. 5 shows a partial section of the stop cage 2a with a development of the invention which consists in that the stop cage 2a comprises an adjusting screw 19 for breaking the chips. In this connection, an internal thread which receives the adjusting screw 19 is arranged at the relevant location of the stop cage 2a. The adjusting screw 19 is adjusted in such a way that a minimal air gap is obtained between the free end of the screw 19 and the countersink corresponding to position 18 according to FIG. 4. This adjustment does not have to be changed again until use is made of a step countersink with a different countersink diameter.

Damage to workpiece surfaces and disruptions of the operational sequence are effectively avoided by means of the invention.

The invention claimed is:

1. A device for limiting the advance during a drilling operation, the device comprising a housing with a stop cage and a spindle mounted rotatably and axially displaceably in the housing, and a stop which is adjustable in the axial direction being arranged for limiting the advance, wherein the stop cage comprises a pin made from plastic and fixed to the housing for breaking the chips, with a housing-side end and a free end, in such a way that it extends approximately parallel and directly adjacent to the workpiece surface and approximately radially from the outside towards the drilling tool in such a way that its free end is separatable by a countersink on the drilling tool during the advance for almost touching the countersink.

2. The device according to claim 1, wherein a cone is pushed and fixed onto the drilling tool.

3. The device according to claim 2, wherein the drilling tool is a stepped drill bit.

* * * * *